United States Patent [19]
Washbourne

[11] 3,972,834
[45] Aug. 3, 1976

[54] CATALYST CARRIERS

[75] Inventor: Colin Washbourne, Birmingham, England

[73] Assignee: Foesco International Limited, Birmingham, England

[22] Filed: Apr. 26, 1974

[21] Appl. No.: 465,143

[30] Foreign Application Priority Data
May 11, 1973 United Kingdom............... 22704/73

[52] U.S. Cl. ..................... 252/455 R; 252/477 R; 106/40 R
[51] Int. Cl.² ..................... B01J 29/06; B01J 35/00
[58] Field of Search .................... 252/455 R, 477 R; 106/40; 161/100, 143, 151, 159

[56] References Cited
UNITED STATES PATENTS

| | | | |
|---|---|---|---|
| 3,255,027 | 6/1966 | Talsma | 252/477 R |
| 3,697,447 | 10/1972 | Bettinardi | 252/477 R |
| 3,769,240 | 10/1973 | Lew et al. | 252/477 R |
| 3,799,796 | 3/1974 | Hunter | 252/477 R |
| 3,839,224 | 10/1974 | Yonehara et al. | 252/477 R |

*Primary Examiner*—Carl F. Dees
*Attorney, Agent, or Firm*—Cushman, Darby & Cushman

[57] ABSTRACT

A ceramic material comprising a cellular ceramic body having ceramic fibers bonded to its internal surfaces. The cellular ceramic body may be a reticular foam-structured ceramic, and the structure may be used as a supported catalyst.

6 Claims, No Drawings

CATALYST CARRIERS

BACKGROUND AND SUMMARY OF THE INVENTION

This invention relates to ceramic materials, in particular to ceramic materials useful as catalyst supports.

The use of materials as supports for catalysts is well known in the fields of chemical engineering, the petroleum industry and in the treatment of exhaust gases from chemical plant, internal combustion-engined motor vehicles and intensive animal husbandry.

Such supports can take many forms, such as loose packings of spheres, rings and the like, or entire structures in the forms of reticula, honeycombs and communicating cells, and inorganic fibres, for example, asbestos, alumino-silicate fibres and silica fibres, are also used.

It is obviously desirable that the geometric surface area presented by the catalyst carrier should be as high as possible, and should preferably promote a degree of turbulence, in order that the reacting liquids or gases passing through the catalyst bed should encounter as much catalytic surface as possible during the dwell-time of the reaction mixture in the bed.

It is also obviously desirable that the catalyst bed should present as little impedance as possible to the flow of reacting fluids through it.

These two desiderata are, to a large extent, mutually incompatible. Spheres, rings reticula, honeycombs and the like can be made highly permeable, but at the expense of presenting a relatively low geometric area; in addition, in honeycombs turbulence can be undesirably low. Fibrous bodies, on the other hand, present a high geometric area, but are resistant to the flow of gases and liquids through them. Attempts to make fibrous bodies permeable by loose packing, or the incorporation of fugitive organic matter which is melted, dissolved or burnt out at some stage during the processing of the fibre shape, are generally effective only in the short term, since under the influence of the pressure drop across them resulting from the continual passage of liquids or gases they eventually become compressed into less permeable structures.

According to the present invention there is provided a ceramic material comprising a cellular ceramic body having ceramic fibres bonded to its internal surfaces. Shaped bodies of such ceramic materials are particularly useful as catalyst supports.

The body may be a structure having essentially parallel channels of, for example, triangular, rectangular, hexagonal or circular cross-section, or the body may be a reticular foam-structured ceramic of the type described in commonly assigned copending U.S. applications Ser. Nos. 318,764, 317,088, and 319,849 (U.S. Pat. No. 3,907,579). Also see Ser. No. 517,253. The latter type of cellular ceramic body is preferred.

Ceramic material which should have a high and substantially constant permeability, may be produced by impregnating a cellular ceramic body with a dispersion of ceramic fibres in a fluid medium.

The maximum length of the ceramic fibre should be such that it readily penetrates into the innermost parts of the cellular ceramic body to which it is to be applied, for example, for a reticular ceramic having 10 pores per linear inch (4 pores per linear centimeter) fibres with lengths below 1 mm are desirable, otherwise the greater proportion of the fibres will simply become deposited on the external surface of the reticular ceramic.

A suitable refractory bonding agent is employed to bond the fibres to one another and to the internal surfaces of the cellular ceramic body. Examples of such materials are aluminum hydroxychloride and alumina or silica hydrosols. The bonding agent may be applied to the fibre-cellular body after forming and drying, but is preferably incorporated in the medium in which the fibre is dispersed prior to impregnation of the cellular shape.

If the material is to be used as a catalyst support, the choice of cellular ceramic, fibre and refractory bonding agent is limited to those materials which will withstand the operating temperature of the catalyst and contain no substances which will adversely affect the performance of the catalyst unless such substances can be completely removed by drying, firing or other processes employed prior to the application of the catalyst.

The cellular ceramic body may be made essentially, for example, of cordierite, silicon nitride, alumina or lithia-alumina-silica. The ceramic fibre may be, for example, alumina, silica, alumino-silicate, zirconia or asbestos fibre.

A preferred class of ceramic materials according to the invention consists of a reticular lithia-alumina-silica ceramic body impregnated with alumino-silicate fibres bound in place by the dried residue of a silica hydrosol.

In manufacturing such ceramic materials, it is of considerable advantage to incorporate a dispersing agent in the fibre dispersion, this agent being added to the medium in which the fibre is dispersed before mechanical means of dispersion (e.g. a high-speed shearing stirrer) are employed. Such an agent helps to disperse the flocks of fibre normally present in commercially available ceramic fibres (particularly those of low average length), serves to prevent the re-aggregation of the dispersed fibre, and aids penetration of the fibre into the remotest parts of the cellular ceramic body.

Such dispersing agents should normally be compatible with the refractory bonding agent used. This is essential when the bonding agent is to be incorporated in the fibre dispersion, although in cases where it is to be applied separately, it is possible to remove the traces of the dispersing agent from the dried fibre-impregnated reticular compact by such means as the use of a suitable solvent or heating to a sufficient temperature to volatilise and/or oxidise the dispersing agent residues.

For example, a quaternary ammonium compound is an excellent dispersant for alumino-silicate fibres, but colloidal silica hydrosols are readily gelled and rendered non-bonding by quaternary ammonium compounds. Thus, when a colloidal silica hydrosol is employed as a refractory bonding agent, an ammonium or alkali metal salt of a low molecular weight polyacrylic acid is the dispersing agent of choice. In this case, minor corrections of pH should be made, preferably by means of a volatile base, e.g. ammonia, monoethanolamine, triethanolamine, to bring it into the range within which the colloidal silica hydrosol is stable. On the other hand, when the refractory bonding agent is acidic, for example, aluminum hydroxychloride, a quaternary ammonium compound would be chosen as dispersing agent. A preferred method of dispersing the ceramic fibres is to use a solution of a modified carboxy-vinyl polymer of a type which has low viscosity at low pH but which forms a thixotropic gel when the pH of the solution is raised. The fibre is mechanically dispersed in the low pH solution by any suitable means, for example, a high-speed shearing mixer, and, when a satisfactory separation of the fibres has been achieved, the pH of the solution is increased by the addition of a base until a gel is formed, thus keeping the fibres apart after the shearing action of the mixer has ceased. The concentration of the polymer solution is so chosen that the final gel is mobile rather than stiff. The base is preferably a volatile base such as ammonia, monoethanolamine or triethanolamine, so that the refractoriness of the fibre coated cellular ceramic body is unaffected by residues such as alkali or alkaline earth metal oxides. A colloidal silica hydrosol binder can then be added to the fibre-in-gel dispersion, and because the dispersion is alkaline the colloidal silica hydrosol is not gelled. Other binders may also be used.

The manner in which the cellular ceramic body is impregnated with the fibre dispersion depends to some extent on the shape of the piece. In thin sections, simple dipping may suffice. With thick or irregular sections, it may be necessary to force the fibre dispersion through the pore spaces of the body by means of pumping or the application of a vacuum to one face whilst the dispersion is supplied to the other. Surplus fibrous slurry may then be removed by centrifuging or, in thin sections, by gravity drainage, and the shape then dried and where necessary fired to develop the ceramic bond.

Whilst the foregoing discussion concerns the use of a dispersion of fibres in liquid, principally aqueous, media, fibres may be sprayed into the cellular ceramic body in a current of air or other gas. In this case, it can be advantageous to render the surface of the cellular ceramic body electrically conducting, for which purpose known means are available and to impart both to the body and to the fibres as they leave the spraying apparatus a high voltage electrostatic charge of the same sign, the resulting repulsion promoting deep penetration of the fibres into the body. In this case, the refractory bonding agent is preferably applied afterwards.

Any of the methods by which whiskers are caused to grow on a substrate by deposition from suitable substances carried in a gaseous phase are also applicable, the cellular ceramic forming the substrate in question.

The following Example will serve to illustrate the invention:

EXAMPLE

Nine grams of alumino-silicate fibre of average length 1 mm were dispersed in 86.5 grams of a 0.25% w/w solution of a modified carboxy-vinyl polymer in water by means of a high speed shearing mixer. When all the fibres were well dispersed and separate from one another, 0.880 specific gravity ammonia solution was added dropwise until gelation occurred, at which point the pH of the dispersion was in the region of 10. To this dispersion was added 4.5 grams of a colloidal silica hydrosol containing 30% w/w colloidal silica solids in water, and thoroughly mixed in.

A piece of reticular alumina-lithia-silica ceramic having 4 pores per linear centimeter was dipped into the fibre dispersion, removed, drained, dried at 110°C and fired at 500°C for 2 hours to remove organic matter. A fibre-coated reticular ceramic body resulted, which could be used as a catalyst support.

I claim as my invention:

1. A ceramic material consisting essentially of a cellular ceramic body having ceramic fibres bonded to its internal surfaces, said ceramic fibres substantially increasing the turbulence induced in a fluid passing through said ceramic body.

2. A material according to claim 1 wherein the cellular ceramic body is a reticular foam-structured ceramic.

3. A ceramic material according to claim 1 wherein the fibres are bonded to the internal surfaces of the ceramic body by a bonding agent selected from the class consisting of aluminum hydroxychloride, alumina hydrosol and silica hydrosol.

4. A ceramic material according to claim 1 wherein the cellular ceramic body consists essentially of a material selected from the class consisting of cordierite, silicon nitride, alumina and lithia-alumina-silica.

5. A ceramic material according to claim 1 wherein the ceramic fibres are selected from the class consisting of alumina, silica, alumino-silicate, zirconia and asbestos fibres.

6. A supported catalyst comprising as support a ceramic material consisting essentially of a cellular ceramic body having ceramic fibres bonded to its internal surfaces, said ceramic fibres substantially increasing the turbulence induced in a fluid passing through said ceramic body.

* * * * *